J. KLATT.
YIELDABLE WHEEL.
APPLICATION FILED APR. 29, 1911.
1,006,759.
Patented Oct. 24, 1911.
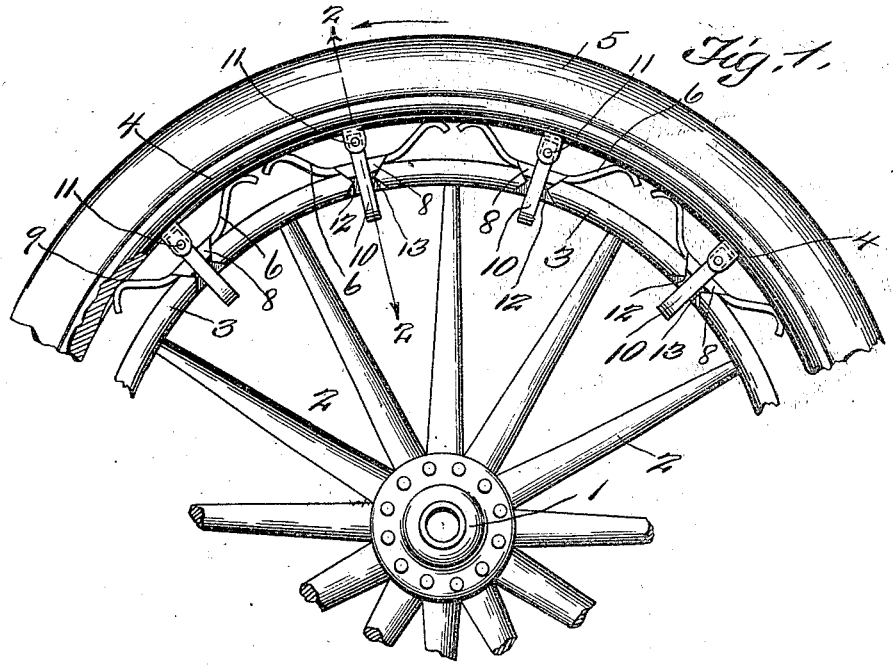
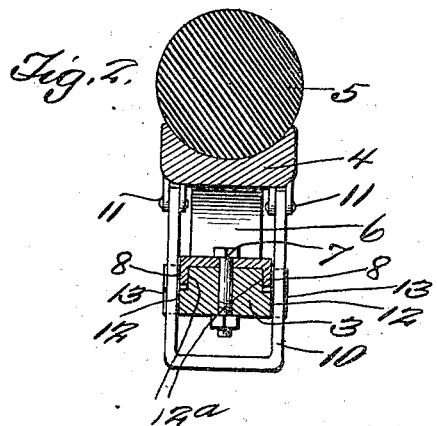
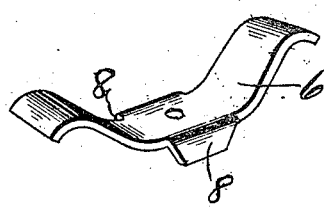
Witnesses
Inventor
John Klatt.
By D. Swift
Attorney

UNITED STATES PATENT OFFICE.

JOHN KLATT, OF BLUE EARTH, MINNESOTA.

YIELDABLE WHEEL.

1,006,759.

Specification of Letters Patent. Patented Oct. 24, 1911.

Application filed April 29, 1911. Serial No. 624,154.

*To all whom it may concern:*

Be it known that I, JOHN KLATT, a citizen of the United States, residing at Blue Earth, in the county of Faribault and State of Minnesota, have invented a new and useful Yieldable Wheel; and I do hereby declare the following to be a full, clear, and exact description of the invention, such as will enable others skilled in the art to which it appertains to make and use the same.

This invention relates to a new and useful resilient vehicle wheel, more especially adapted for use upon automobiles.

The invention in its broadest scope, aims as its primary object, to provide a simple, efficient, novel and practical wheel of this design, to be used in place of automobile wheels having pneumatic tires.

A further object of the invention is to provide an inner and outer rim, having resilient members or springs arranged between them, said resilient members or springs having oppositely arranged lips to engage opposite sides of the inner rim, to prevent lateral movement of the members or springs.

A further object of the invention is to provide guide loops arching over the inner rim, for guiding the outer rim as it yields relatively with regard to the inner rim. The inner rim is provided with recesses to receive the sides of the loop for holding them in place.

A further object of the invention is the provision of a solid tire to surround the outer rim, in place of the pneumatic tires now in use.

In the drawings, there is only disclosed one embodiment of the invention, but in practical fields this embodiment may require alterations, to which the applicant is entitled, provided the alterations are comprehended within the scope of what is claimed.

The invention comprises further features and combination of parts, as hereinafter set forth, shown in the drawings and claimed.

In the drawings: Figure 1 is a view in elevation of a portion of a vehicle wheel, constructed in accordance with the invention. Fig. 2 is an enlarged detail sectional view on line 2—2 of Fig. 1. Fig. 3 is a detail view of one of the spring or resilient members.

Referring more particularly to the drawings, 1 designates the usual form of hub, while 2 designates the spokes of the wheel, which connect with the inner rim 3. Surrounding the inner rim is an outer rim 4, about which surrounds a solid rolled rubber tire 5.

Arranged between the inner and outer rims are a plurality of leaf springs 6, of the shape shown in the drawings. These springs are secured in place by means of the bolts 7 (which are threaded into the inner rim) and the lips 8, which engage upon each side of the inner rim. The object in providing the lips 8 is to provide means to prevent the leaf springs from oscillating laterally, incident to the movement of the outer rim with regard to the inner rim. To further insure against this lateral movement, the free ends of the springs engage slight depressions 9 of the inner circumference of the outer rim.

To guide the outer rim with relation to the inner rim, incident to its movement with regard to the inner rim, U-shaped metallic loops are provided. These loops 10 arch over the inner rim, and are secured at 11 to the outer rim, as shown. To hold the loops, in place with relation to the inner rim, the inner rim is provided with a series of recesses 12, the end walls of which designated by the character 13, engage on each side of the side portions of the loops. These end walls are shaped in such wise as to permit the loops to freely move relatively with regard to the inner rim, as will be clearly understood. The inner rim is provided with recesses 12ª adjoining the recesses 12, designed for the purpose of receiving the lips 8.

From the foregoing, it is to be noted that there has been devised a novel, efficient and simple and practical resilient vehicle wheel, and one which has been found to be an excellent substitute for automobile wheels having pneumatic tires.

The invention having been set forth, what is claimed as new and useful, is:

1. In combination, an inner and outer rim having resilient leaf springs arranged therebetween, metallic loops arching over the inner rim and connected to the outer rim, the inner rim having a plurality of recesses, to receive the opposite sides of the loops, for holding the inner rim in place, as it vibrates vertically, means for connecting the springs to the inner rim, said springs having lips integral therewith, engageable upon either side of the inner rim to prevent oscillating movement of the springs.

2. In combination, an inner and outer rim having resilient leaf springs arranged therebetween, metallic loops arching over the inner rim and connected to the outer rim, the inner rim having a plurality of recesses, to receive the opposite sides of the loops, for holding the inner rim in place, as it vibrates, means for connecting the springs to the inner rim, said springs having lips integral therewith, engageable upon either side of the inner rim to prevent oscillating movement of the springs, said outer rim having slight depressions to receive the free ends of the springs to further insure the springs against oscillating lateral movements.

3. In combination, an inner and outer rim having resilient leaf springs arranged therebetween, the outer rim having lugs, metallic U-shaped loops arching over the inner rim and pivoted between the lugs, the inner rim having a plurality of recesses to receive the opposite sides of the loop for guiding the inner rim as it vibrates, bolts for connecting the springs to the inner rim, the inner rim having recesses adjoining the first recesses, the springs having lips integral therewith fitting the adjoining recesses to prevent oscillating movement of the springs, the outer rim having slight depressions to receive the free ends of the springs to further insure the springs against oscillating movements.

In testimony whereof I have signed my name to this specification in the presence of two subscribing witnesses.

JOHN KLATT.

Witnesses:
 EMIL G. SOHN,
 WALTER G. KLATT.